(12) United States Patent
Baird et al.

(10) Patent No.: US 7,907,389 B2
(45) Date of Patent: Mar. 15, 2011

(54) SEALED CIRCUIT BREAKER

(75) Inventors: Neil Baird, Kitchener (CA); Ian Jenkins, Kitchener (CA); Nabil L. Mina, Roselle, IL (US); Yogesh D. Kanole, Pune (IN)

(73) Assignee: EGS Electrical Group LLC, Rosemont, IL (US)

( * ) Notice: Subject to any disclaimer, the term of this patent is extended or adjusted under 35 U.S.C. 154(b) by 79 days.

(21) Appl. No.: 12/283,053

(22) Filed: Sep. 9, 2008

(65) Prior Publication Data
US 2010/0033907 A1 Feb. 11, 2010

(30) Foreign Application Priority Data

Aug. 6, 2008 (IN) .................. 1673/MUM/2008

(51) Int. Cl.
*H02B 1/04* (2006.01)
(52) U.S. Cl. ........ 361/643; 361/658; 361/641; 361/648; 361/656; 361/657; 174/52.1; 174/52.3
(58) Field of Classification Search .................. None
See application file for complete search history.

(56) References Cited

U.S. PATENT DOCUMENTS

| 2,786,936 | A | 3/1957 | Appleton |
| 3,675,007 | A | 7/1972 | Appleton et al. |
| 3,986,081 | A | 10/1976 | Norden |
| 4,034,170 | A | 7/1977 | Raabe et al. |
| 4,156,121 | A | 5/1979 | Klein et al. |
| 4,180,177 | A | 12/1979 | Gunderman et al. |
| 4,260,863 | A | 4/1981 | Appleton |
| 4,620,061 | A | 10/1986 | Appleton |
| 4,717,987 | A * | 1/1988 | Newmark et al. ............. 361/632 |
| 4,783,718 | A | 11/1988 | Raabe et al. |
| 4,894,632 | A | 1/1990 | Castonguay et al. |
| 4,913,503 | A | 4/1990 | Castonguay et al. |
| 4,914,262 | A | 4/1990 | Appleton |
| 4,965,414 | A | 10/1990 | Sobotka, Jr. et al. |

(Continued)

FOREIGN PATENT DOCUMENTS

CA 2373527 A1 6/2002

(Continued)

OTHER PUBLICATIONS

"Crouse-Hinds" Catalogue pp. 526-527 (2002).

(Continued)

*Primary Examiner* — Boris L Chervinsky
(74) *Attorney, Agent, or Firm* — McDonnell Boehnen Hulbert & Berghoff

(57) ABSTRACT

A sealed electrical enclosure used in hazardous locations for enclosing circuit breakers having a bottom housing and a top housing with a labyrinth seal or joint formed therebetween, the bottom housing adapted to receive one or more circuit breakers, a first metal bus extending from a point internal to the bottom housing through a first end wall to a point external thereto, and a second metal bus extending from a point internal to the bottom housing through a second end wall to a point external to thereto, where the first and second metal buses are adapted to contact first and second electrical terminals of a circuit breaker when placed within the bottom housing, and a first vent positioned on the top housing for dissipating pressure buildup, wherein the top housing is removably secured to the bottom housing to allow for removal and replacement of a circuit breakers within the housing.

23 Claims, 12 Drawing Sheets

U.S. PATENT DOCUMENTS

| | | | |
|---|---|---|---|
| 4,965,544 A | 10/1990 | Kelaita, Jr. et al. | |
| 4,978,816 A | 12/1990 | Castonguay et al. | |
| 5,070,361 A | 12/1991 | Magnon et al. | |
| 5,151,564 A | 9/1992 | Rowe | |
| 5,202,538 A | 4/1993 | Skirpan | |
| 5,260,531 A | 11/1993 | Yarbrough et al. | |
| 5,272,296 A | 12/1993 | Robarge et al. | |
| 5,286,935 A | 2/1994 | Mina et al. | |
| 5,334,939 A | 8/1994 | Yarbrough | |
| 5,351,165 A | 9/1994 | Hancock | |
| 5,410,446 A | 4/1995 | Wright et al. | |
| 5,414,584 A | 5/1995 | Young | |
| 5,457,296 A | 10/1995 | Neill et al. | |
| 5,597,991 A | 1/1997 | Chen et al. | |
| 5,607,047 A | 3/1997 | Leet et al. | |
| 5,634,553 A | 6/1997 | Hopper et al. | |
| 5,663,862 A | 9/1997 | Hopping-Mills | |
| 5,717,182 A | 2/1998 | Mina et al. | |
| 5,721,667 A * | 2/1998 | Rose | 361/627 |
| 5,753,878 A | 5/1998 | Doughty et al. | |
| 5,838,219 A | 11/1998 | Du et al. | |
| 5,857,563 A | 1/1999 | Helmer et al. | |
| 5,870,278 A * | 2/1999 | Girard et al. | 361/627 |
| 5,886,868 A | 3/1999 | White et al. | |
| 5,894,404 A | 4/1999 | Vrnak et al. | |
| 5,902,973 A | 5/1999 | Ramey et al. | |
| 5,911,316 A | 6/1999 | Chu | |
| 5,936,214 A * | 8/1999 | Phillips | 200/43.22 |
| 5,969,587 A | 10/1999 | Combas | |
| 6,040,543 A | 3/2000 | Mina et al. | |
| 6,087,609 A | 7/2000 | Thilker et al. | |
| 6,100,481 A | 8/2000 | Castonguay et al. | |
| 6,229,692 B1 | 5/2001 | Stendardo et al. | |
| 6,838,962 B2 | 1/2005 | Leone et al. | |
| 6,989,996 B2 | 1/2006 | Wells et al. | |
| 7,400,239 B2 * | 7/2008 | Kiko et al. | 340/501 |
| 2004/0045796 A1 | 3/2004 | Azzola et al. | |
| 2004/0196640 A1 | 10/2004 | Wells et al. | |
| 2006/0291148 A1 | 12/2006 | Kelly et al. | |

FOREIGN PATENT DOCUMENTS

| | | |
|---|---|---|
| DE | 8805069 | 7/1998 |
| FR | 2622734 A1 | 11/1987 |

OTHER PUBLICATIONS

A.T.X. Catalog "Electrical Equipment for Hazardous Areas," pp. 42, 144, 146, 152, 153, 162-167 (1998).

Figures 1-5 of a crouse-hinds breaker obtained approx. Jun. 2006.

Legrand A.T.X Catalogue, pp. 2, 4, 5, 10 (1987-88).

International Application No. PCT/US2010/036442 International Search Report and Written Opinion dated Nov. 30, 2010.

Google Translation of DE8805069 Nov. 3, 2011.

* cited by examiner

TOP VIEW

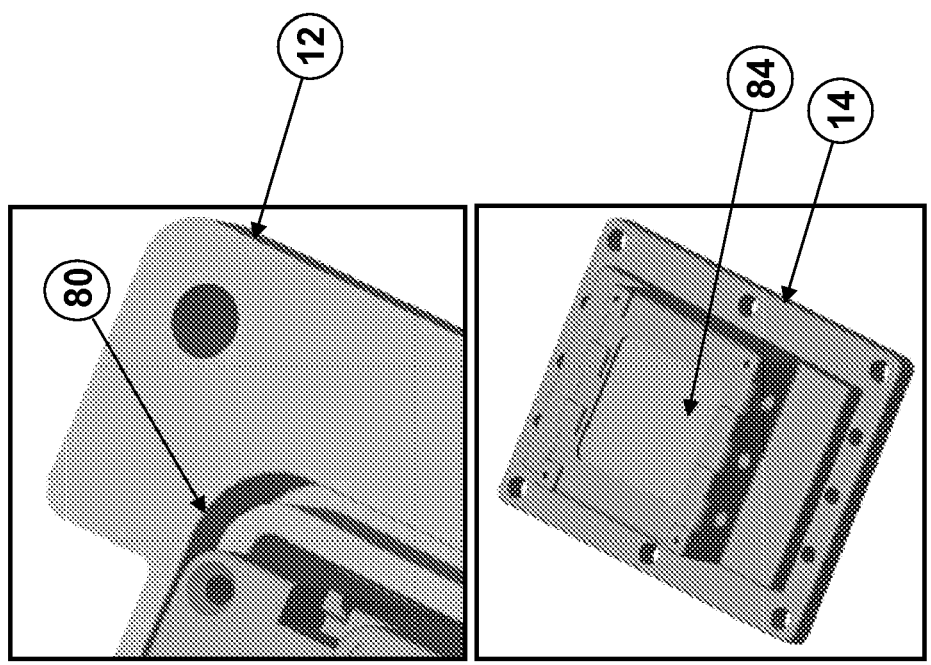
*Figure 8*
*Figure 9*
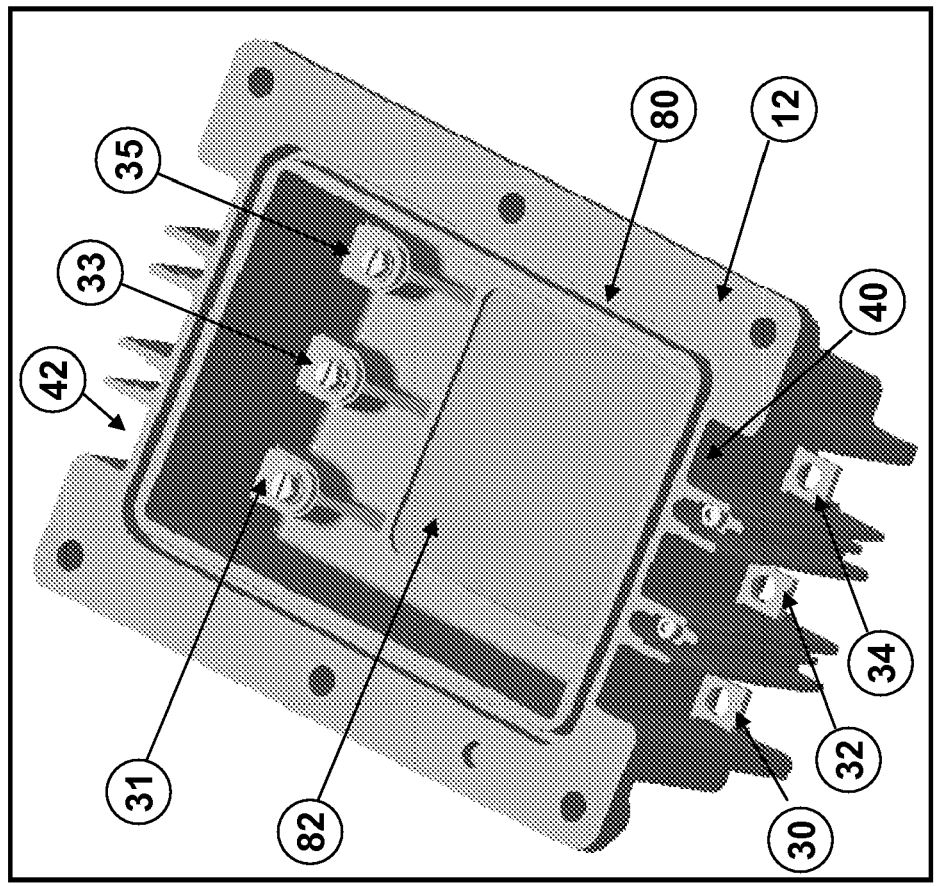
*Figure 7*

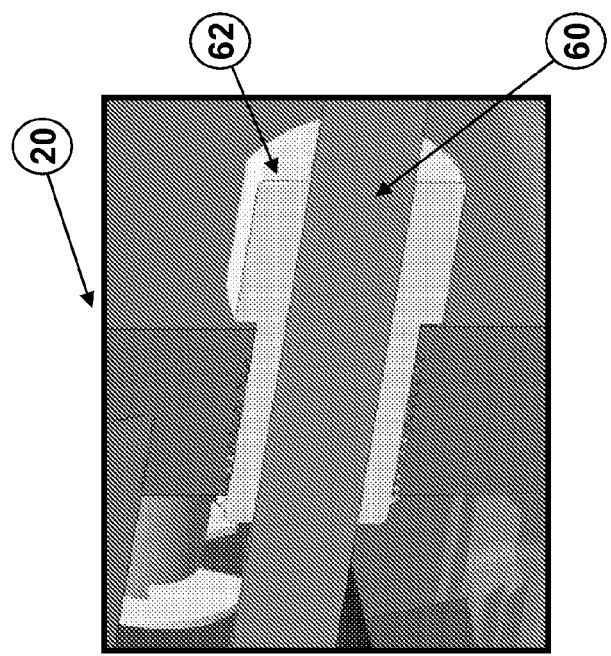
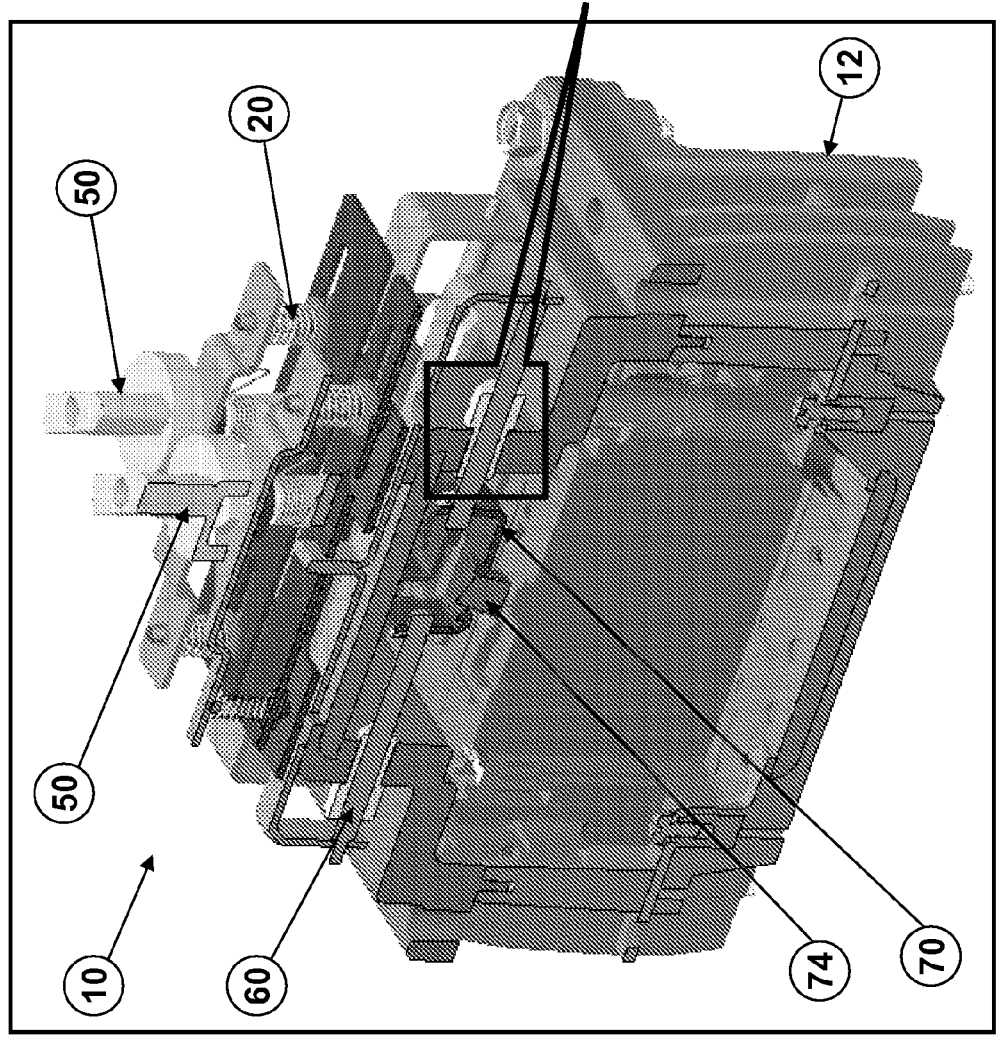
*Figure 11*
*Figure 10*

SEALED CIRCUIT BREAKER

BACKGROUND

1. Field of the Application

This application relates generally to sealed electrical enclosures for use in hazardous locations for a variety of electrical components, such as circuit breakers, motor switches, GFI devices, and photocells.

2. Description of the Related Art

Traditionally, in North America, to use circuit breakers in a hazardous (classified) area, standard circuit breakers are placed in a cast metal housing such as aluminum, wherein the cast metal housing is bolted shut. In such an arrangement, the circuit breaker switches may be manipulated through a cast metal door that is bolted to the cast metal housing. In North America, this construction is suitable for Class I Division 1 and Class I Division 2 applications. A drawback of this arrangement is that the cast iron enclosures are heavy and cumbersome. Furthermore, it can be time consuming and laborious to remove the often extensive number of bolts from the cast metal housing to access the circuit breakers within. Thus, replacing circuit breakers using enclosures with this construction can be time consuming and costly.

Alternatively, in Europe, in accordance with IEC methodology, traditionally each circuit breaker or other electrical device is separately and permanently sealed (often potted in epoxy) to provide a flame proof device. Each flame proof sealed circuit breaker or electrical device is then typically placed in a non-metallic or sheet metal enclosure. Each sealed circuit breaker typically has a handle or switch that extends through a door of the non-metallic or sheet metal enclosure to allow for manipulation of the handle or switch. In the event that a circuit breaker needs to be replaced, the flame proof circuit breaker is removed, and a replacement flame proof circuit breaker installed. A drawback to this methodology is that it is more costly to replace each separately sealed flame proof circuit breakers than it is to replace non-flame proof circuit breakers.

There has been an increased demand for sealed breakers in North America. Thus, there is a need to provide an electrical enclosure for use in hazardous (classified) locations that can provide for the removal and replacement of circuit breakers or other electrical components from a reusable electrical enclosure. For purposes of this application the term "hazardous locations" and "hazardous (classified) locations" shall mean areas classified by the National Electric Code (NEC), such as NEC Class I, Division 1 areas.

SUMMARY

The present application provides a sealed electrical enclosure for use in hazardous locations for enclosing circuit breakers or other electrical components comprising a bottom housing and a top housing positioned thereabove; a labyrinth seal or joint being formed between the bottom housing and the top housing; the bottom housing adapted to receive a plurality of circuit breakers or other electrical components; and a first metal bus extending from a point internal to the bottom housing through a first end wall to a point external to the bottom housing; and a second metal bus extending from a point internal to the bottom housing through a second end wall to a point external to the bottom housing; where the first metal bus and the second metal bus are adapted to contact first and second electrical terminals of a first circuit breaker placed within the bottom housing; and a first actuating mechanism positioned on the top housing adapted for manipulating one or more switches of circuit breakers or electrical components positioned within the bottom housing; and a first vent positioned on the top housing for dissipating heat or pressure buildup within the housing; and wherein the top housing is removably secured to the bottom housing to allow for removal and replacement of circuit breakers or other electrical components within the housing.

BRIEF DESCRIPTION OF THE DRAWINGS

Exemplary embodiments of the invention are described herein with reference to the drawings, in which:

FIG. 7 is a top perspective view of the bottom housing of the sealed electrical enclosure of FIG. 1;

FIG. 8 is a close up view of a portion of the bottom housing of FIG. 7;

FIG. 9 is a top perspective view of the top housing of the sealed electrical enclosure of FIG. 1;

FIG. 10 is a partial cut-away view of a sealed electrical enclosure;

FIG. 11 is a cut-away view of a portion of the actuating mechanism of the sealed electrical enclosure of FIG. 1;

DETAILED DESCRIPTION

Figure 1:
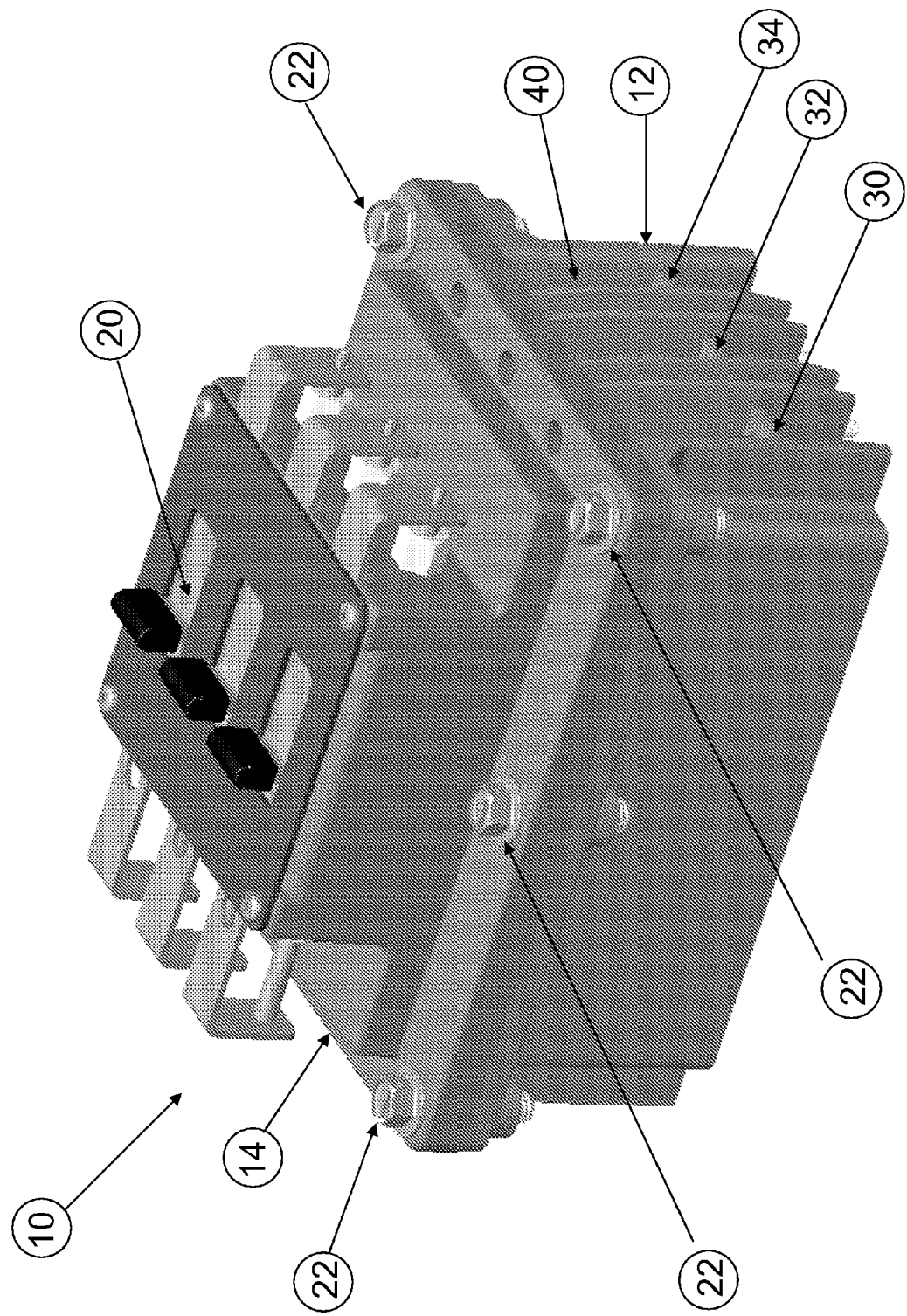
FIG. 1 is a perspective view of an embodiment of a sealed electrical enclosure.

Referring to FIG. 1, a perspective view of sealed electrical enclosure 10 is shown having bottom housing 12 and top housing 14, with top housing 14 being removably secured to bottom housing 12 using bolts 22. Of course, it is not required to use bolts, but any other suitable means of removably securing top housing 14 to bottom housing 12 could be used such as clips, screws, clamps, latches, etc. Preferably bottom housing 12 and top housing 14 are comprised of hard non-conductive material such as a plastic or composite material, most preferably Solvay IXEF 1022 or Ryton R-4.

Sealed electrical enclosure 10 further includes an actuating mechanism 20 that allows for the manipulation of the switches of circuit breakers or other electrical components positioned within the enclosure 10. The actuating mechanism 20 provides for linear actuation, although rotary actuation could be used as well. Enclosure 10 may be used to house various types of circuit breakers and other electrical components such as circuit interrupters, motor switches, GFI devices, and photocells to name a few. Further, enclosure 10 may be used to house both IEC and NEC approved products.

As shown in FIG. 1, electrical buses 30, 32, and 34 extend from a point within the enclosure 10 through a first sidewall 40 to a point external to the enclosure 10 as shown. In this manner, circuit breakers or other electrical products may be positioned entirely within enclosure 10 and electrically connected to electrical terminals in an electrical panel box (not shown). Using the configuration shown, sealed enclosure 10 provides for a flame proof housing for use in Class I, Division 2 applications, and in hazardous locations or areas classified by divisions or zones such as Class I, Zone 1.

With the configuration of sealed electrical enclosure 10, by removing bolts 22, top housing 14 may be removed from bottom housing 12. As a result, the circuit breakers or other electrical products positioned within the enclosure 10 may be removed and replaced, while allowing sealed electrical enclosure 10 to be reused.

Figure 2:
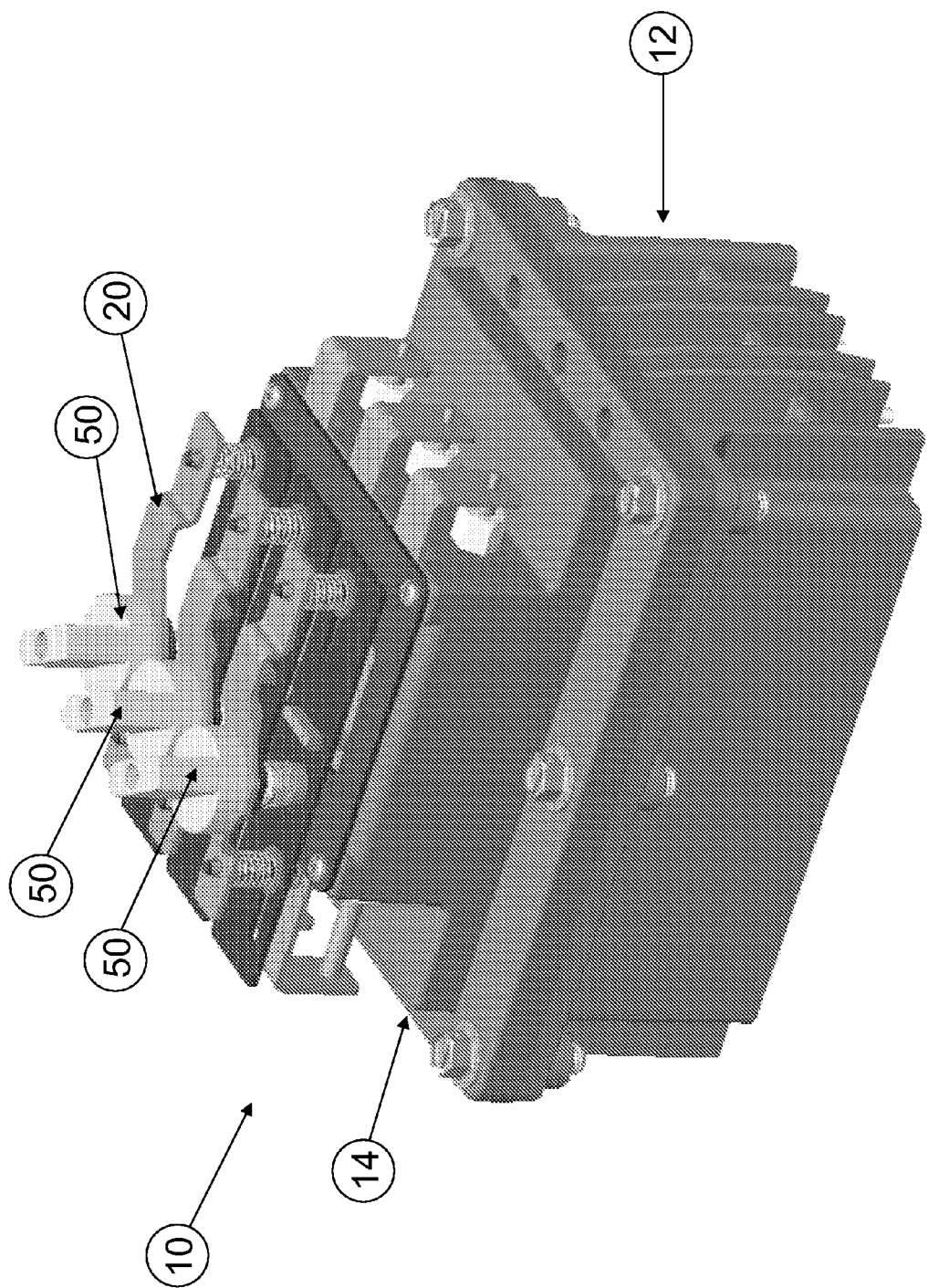
FIG. 2 is a perspective view of an embodiment of the sealed electrical enclosure of FIG. 1 adapted for operation externally from an electrical panel box.

FIG. 2 discloses sealed electrical enclosure 10, with external actuating mechanism 20 further including knobs or extensions 50 that allow the enclosure 10 to be positioned within an electrical panel box (not shown), and still allow for the actuating mechanism to manipulate the switch of a circuit breaker or other electrical device positioned within enclosure 10.

Figure 3:
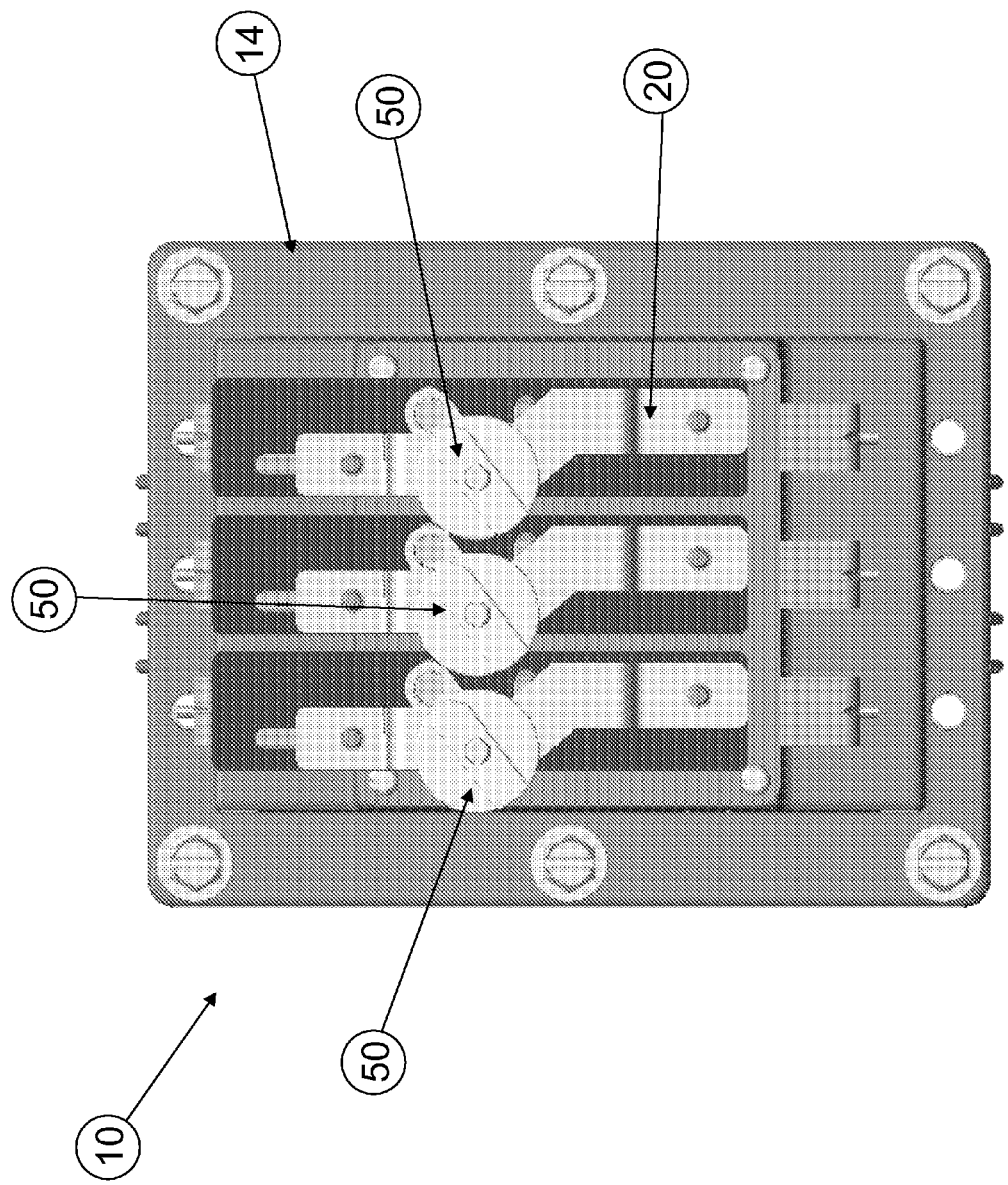
FIG. 3 is a top view of the sealed electrical enclosure of FIG. 2.

FIG. 3 is a top view of the enclosure 10 shown in FIG. 2 showing another view of knobs or extensions 50 positioned on top housing 14.

Figure 4:
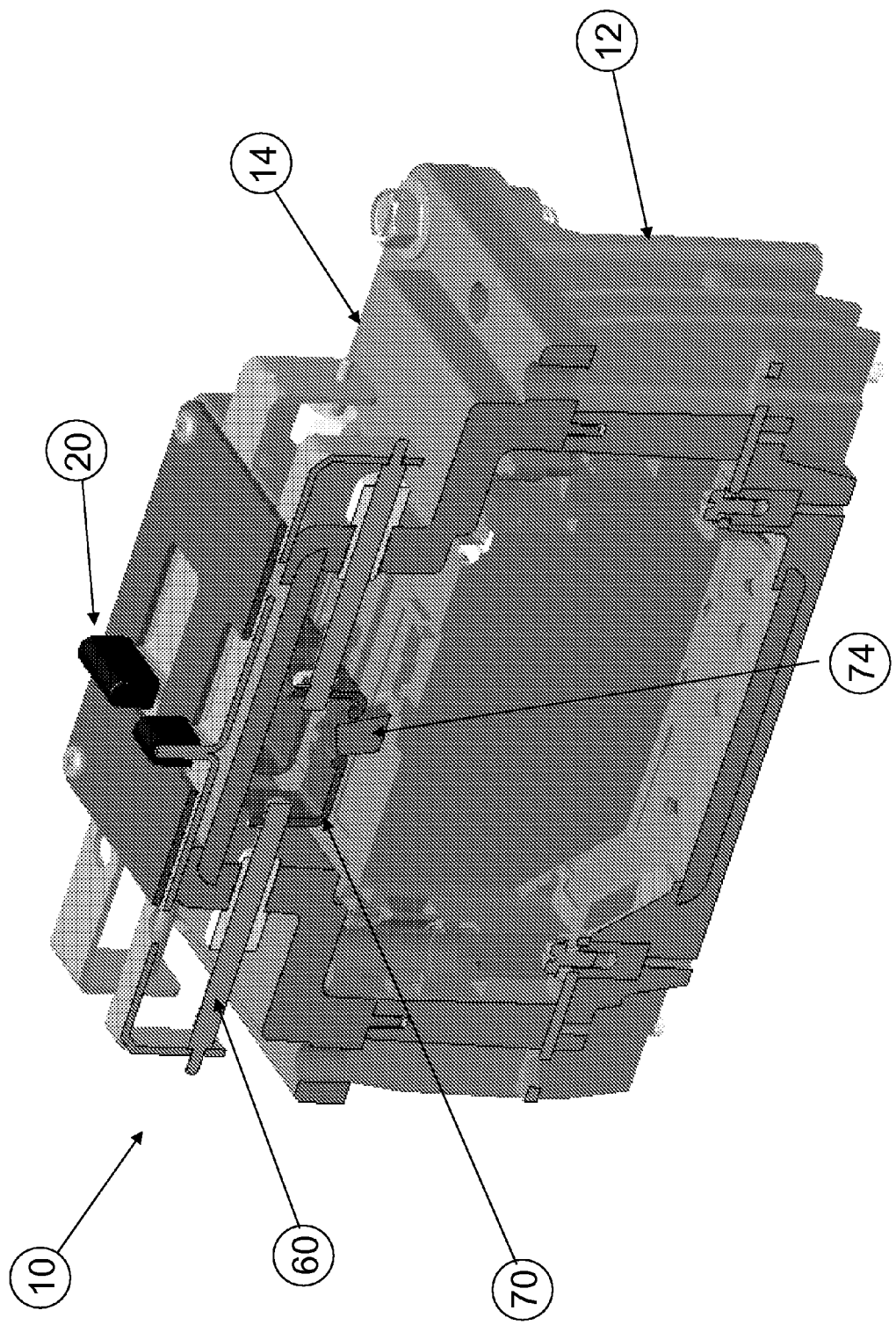
FIG. 4 is a perspective cut-away view of the sealed electrical enclosure of FIG. 1.

FIG. 4 shows a sectional, perspective view of sealed electrical enclosure 10 with actuating mechanism 20 on top housing 14 including a slidable rigid rod 60 as well as a switch manipulator 70 attached thereto for manipulating switch 74 of a circuit breaker or other electrical device.

Figure 5:
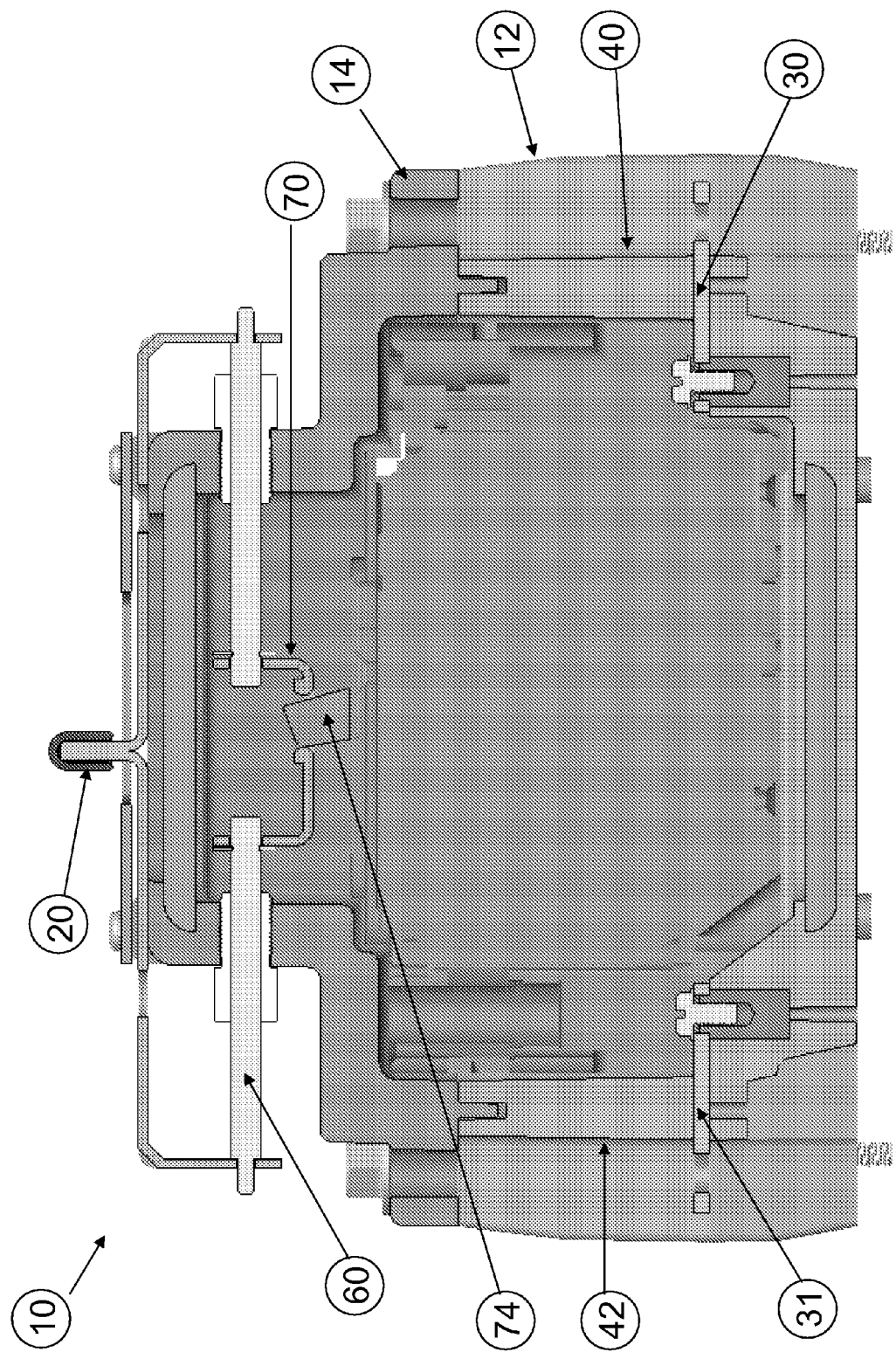
FIG. 5 is a sectional view of the sealed electrical enclosure of FIG. 1.

FIG. 5 shows a side sectional view of enclosure 10 and provides another view of actuating mechanism 20 including slidable rigid rod 60 that may be moved in a slidable manner within top housing 14, as well as switch manipulator 70 attached thereto for manipulating switch 74. FIG. 5 also shows electrical bus 30 extending from a point within bottom housing 12 through a first sidewall 40 of bottom housing 12 to a point external to enclosure 10. Similarly, electrical bus 31 is shown extending from a point within bottom housing 12 through second sidewall 42 of bottom housing 12 to a point external to enclosure 10. This configuration having electrical buses 30 and 31 extending through the first and second sidewalls 40 and 42 respectively allows a circuit breaker to be positioned within the enclosure 10 with a first electrical terminal of the circuit breaker contacting bus 30 inside of the bottom housing 12 and a second electrical terminal of the circuit breaker contacting bus 31 inside of the bottom housing 12 and thereby providing an electrical connection via bus 30 and 31 to a point external of enclosure 10 to allow further electrical connection to electric terminals within an electrical panel box.

This configuration allows for the circuit breakers to be completely enclosed with the enclosure 10, but provides for electrical connection of the circuit breaker to other electrical terminals external to the box. In this manner, the enclosure 10 provides a flame proof enclosure for use in hazardous (classified) areas with the manipulation of the switch 74 external to the enclosure. With such a design, the circuit breakers within the enclosure 10 do not themselves need to be flame proof and can be more easily removed and replaced simply by removing top housing 14 while allowing sealed enclosure 10 to be reused.

With respect to FIGS. 1 and 5, buses 30-35 are preferably positioned within their respective sidewalls by a molding process. One method of molding the buses into the sidewalls is by placing the buses into the mold before the molten plastic fills the mold.

Figure 6:
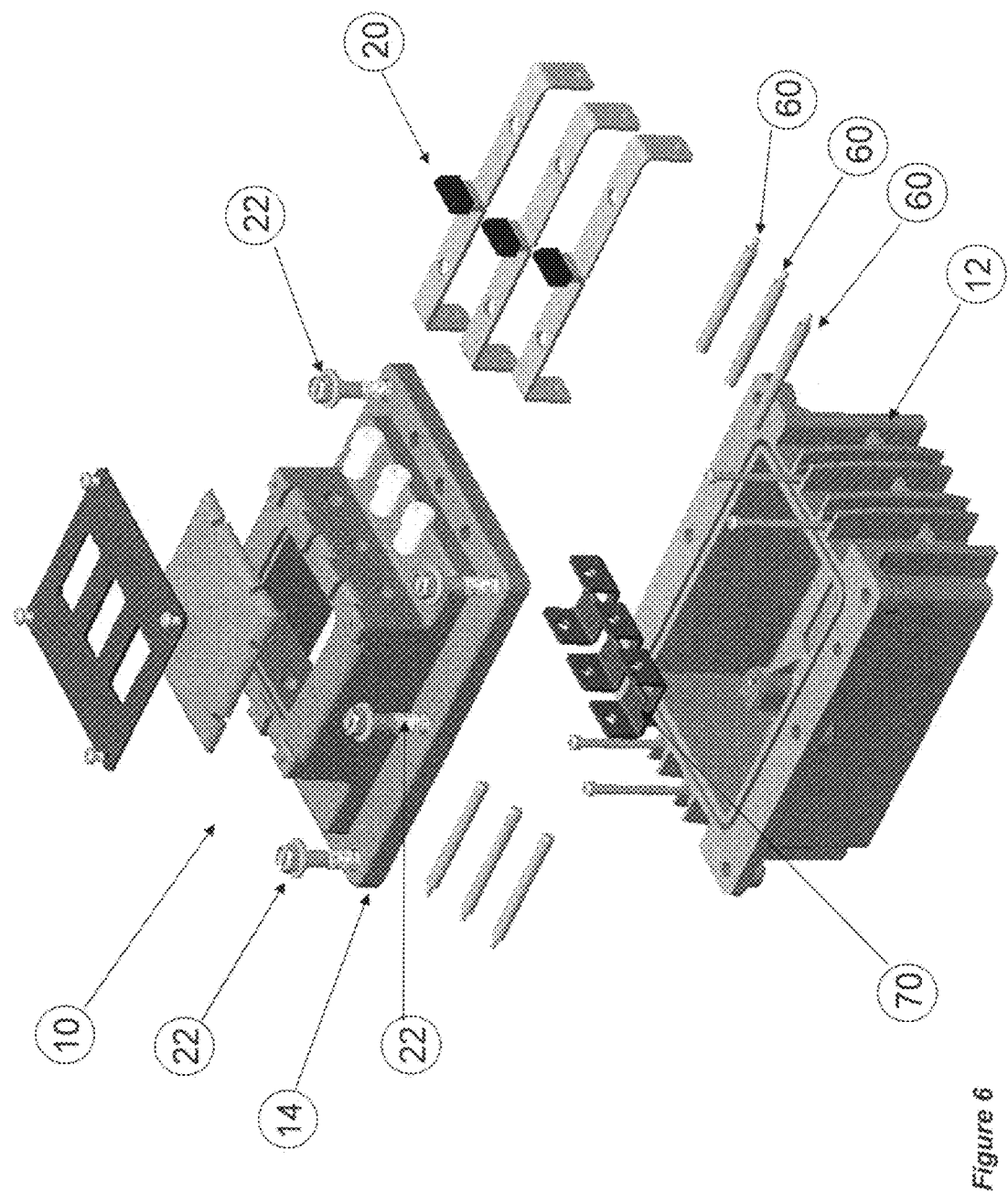
FIG. 6 is an exploded view of a sealed electrical enclosure.

FIG. 6 shows an exploded view of sealed enclosure 10. In this embodiment, there are shown three separate actuating mechanisms 20 each using a slidable rigid rod 60 with bolts 22 shown on top housing 14. It should be noted that while slidable rigid rod 60 is preferably of a round cross-section, it could also have a square, hexagonal, oval or other cross-section. Thus, the term "rod" is not limited to a rod having a round cross-section, but encompasses any other suitable geometry as well.

FIG. 7 shows a perspective view of bottom housing 12, showing electrical buses 30, 32, and 34 extending through first sidewall 40 from a point within the bottom housing 12. FIG. 7 further shows buses 31, 33, and 35 positioned within bottom housing 12 into (and through) second sidewall 42 to a point external to the enclosure 10. Bottom housing 12 also includes labyrinth channel 80 that is adapted to receive a corresponding labyrinth extension of the top housing 14 (not shown) to form a labyrinth seal or joint, or flame path. A serrated joint could also be used. Also shown in a bottom wall of bottom housing 12 is a venting plate or vent 82 that allows for pressure and heat to dissipate within the enclosure. Vent 82 is preferably formed of a sintered bronze material. Other materials could be used as the vent material such as stainless steel or aluminum.

FIG. 8 shows a close up view of a portion of bottom housing 12 more clearly showing labyrinth channel 80.

FIG. 9 shows a perspective view of top housing 14 and shows a venting plate or 84 vent positioned on the top thereof. Similar to venting plate 82 shown in FIG. 7, vent 84 allows for pressure and heat to dissipate within the enclosure. Vent 84 is also preferably formed of a sintered bronze material.

FIG. 10 is a partial cut-away view of sealed electrical enclosure 10 showing knobs or extensions 50 positioned on actuating mechanism 20. In this Figure, switch manipulator 70 is shown connected to slidable rigid rod 60 for manipulating switch 74 of a circuit breaker or other electrical component.

FIG. 11 shows a close up view of slidable rigid rod 60 that slidably extends through bushing 62 that is threadably connected to actuating mechanism 20. Preferably, there is a very close tolerance between rod 60 and bushing 62 to eliminate any flame path from within the enclosure 10. Preferably a 0.002 maximum clearance is used.

Figure 13:
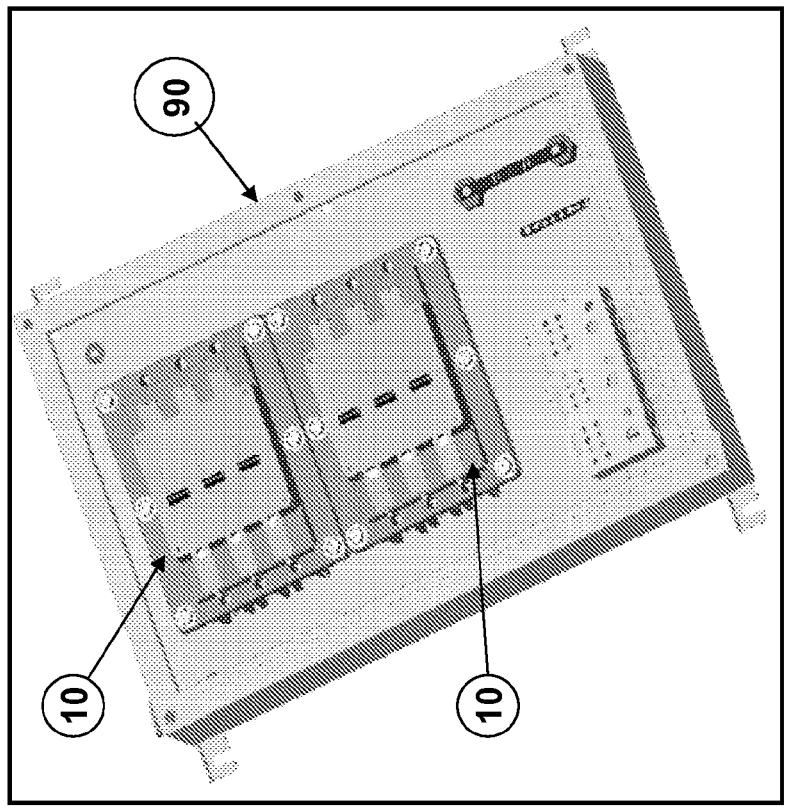
FIG. 13 is a perspective view of two sealed electrical enclosures positioned within an electrical panel box.
Figure 12:
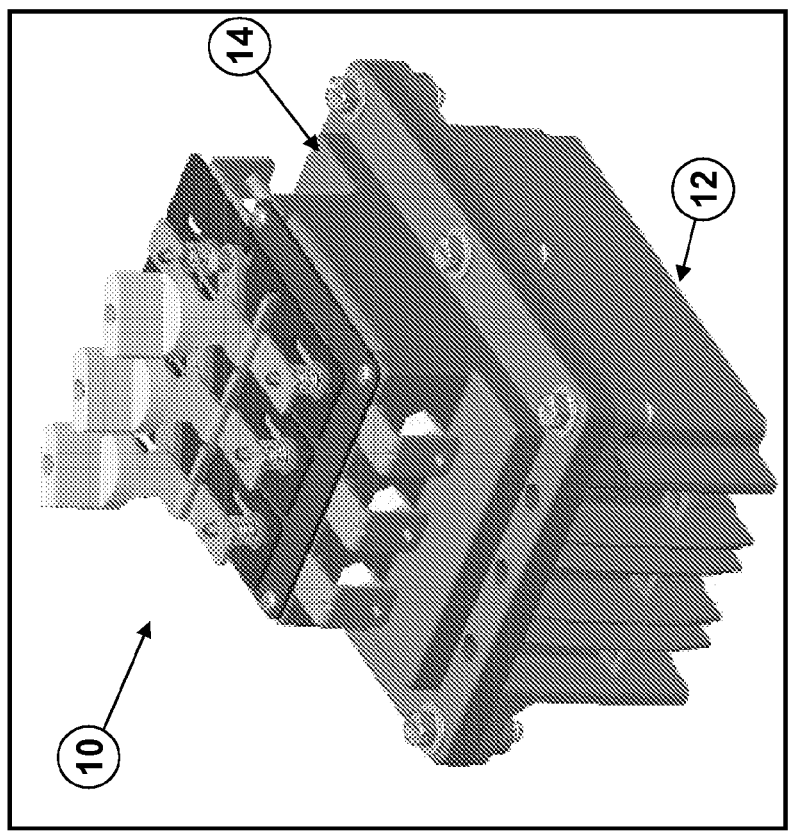
FIG. 12 is a perspective view of a sealed electrical enclosure.

FIG. 12 shows a perspective view of sealed electrical enclosure 10 with bottom housing 12 and top housing 14 and FIG. 13 shows electrical panel box 90 with two sealed enclosures 10 positioned therein.

Figure 14:
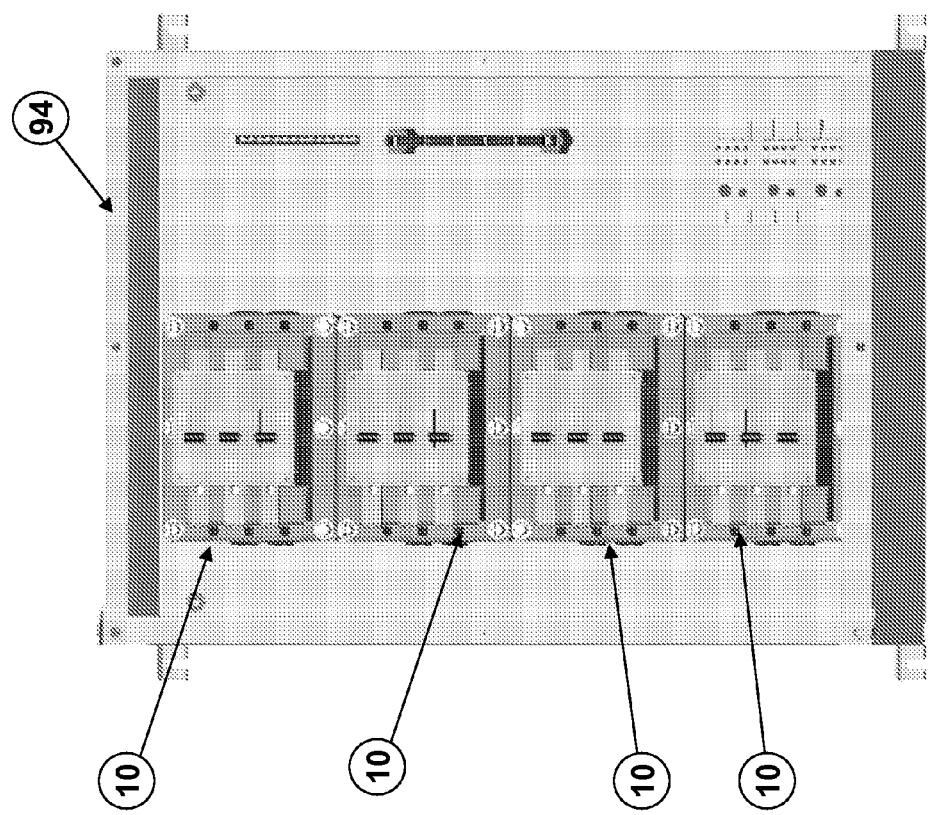
FIG. 14 is a perspective view of four sealed electrical enclosures positioned within an electrical panel box.

FIG. 14 shows four sealed enclosures 10 alternately positioned within an electrical panel box 94.

Figure 15:
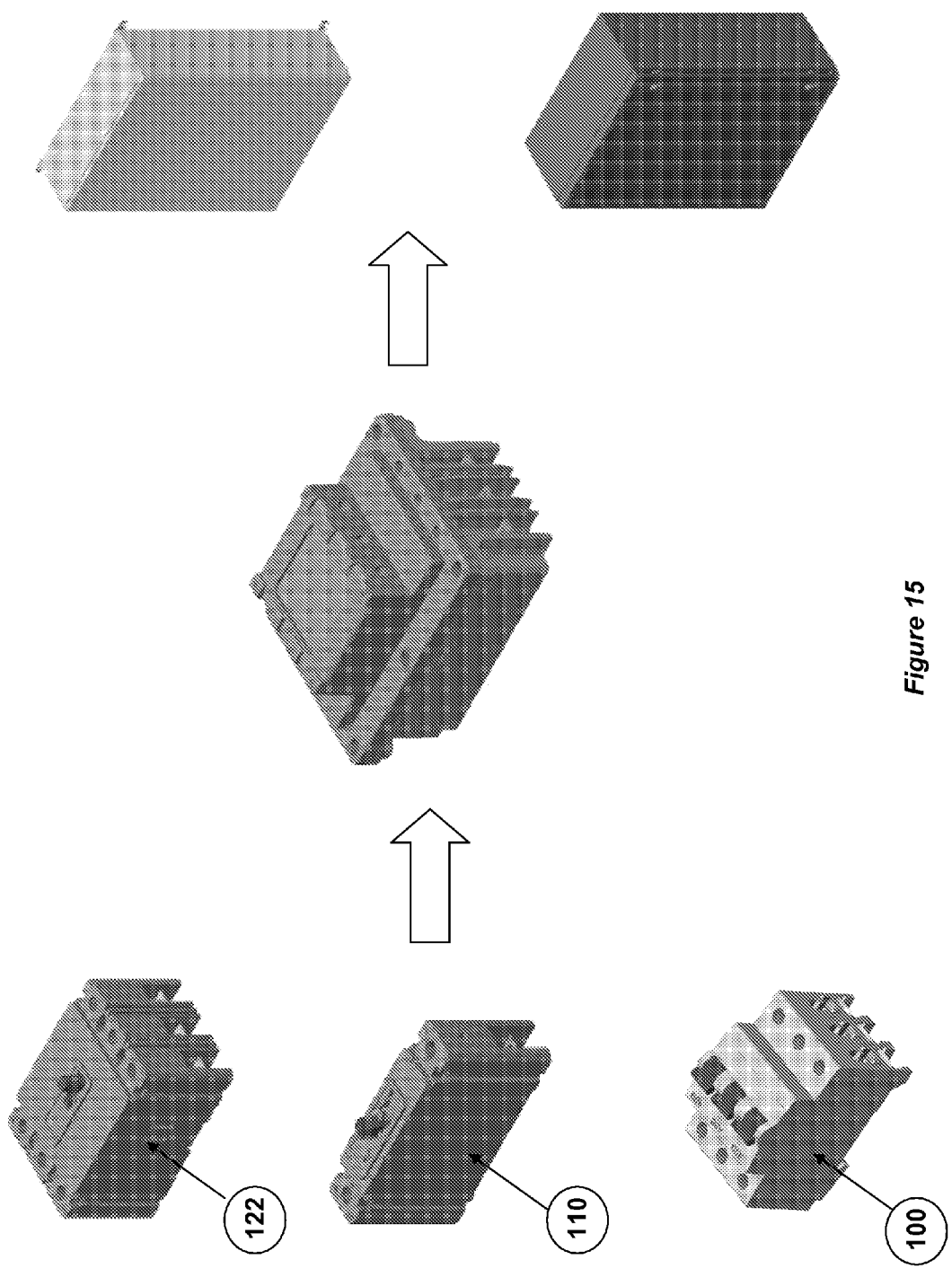
FIG. 15 is a perspective view of various circuit breakers that may be positioned within the sealed electrical enclosure of FIG. 1.

FIG. 15 shows various circuit breakers or electrical devices that may be positioned within the enclosure 10. Numeral 110 refers to a one-pole NEC circuit breaker design, while numeral 122 refers to a three-pole NEC circuit breaker design. Numeral 100 references IEC circuit breakers or interrupters that also may be positioned within enclosure 10. Of course, many other kinds of circuit breakers could be used with this enclosure, including two pole designs.

The present invention is shown in a particular configuration for illustrative purposes only. The enclosure 10 may have varying geometries to accommodate various sized circuit breakers and electrical components. It is contemplated that the enclosure 10 may be used with all of the F-Series or F-frame circuit breaker skus currently available from Cutler-Hammer, ranging up to 225 amps, and covering 1, 2, and 3 pole versions. It is also contemplated that the enclosure 10 may be used with all of the QC Series circuit breaker skus currently available from Cutler-Hammer, ranging up to 100 amps, and covering 1, 2, and 3 pole versions. With some possible modification to the geometry of the housing, it is contemplated that the present design would be suitable for use for many different types of available or yet to be released circuit breakers.

Figures 16, 17:
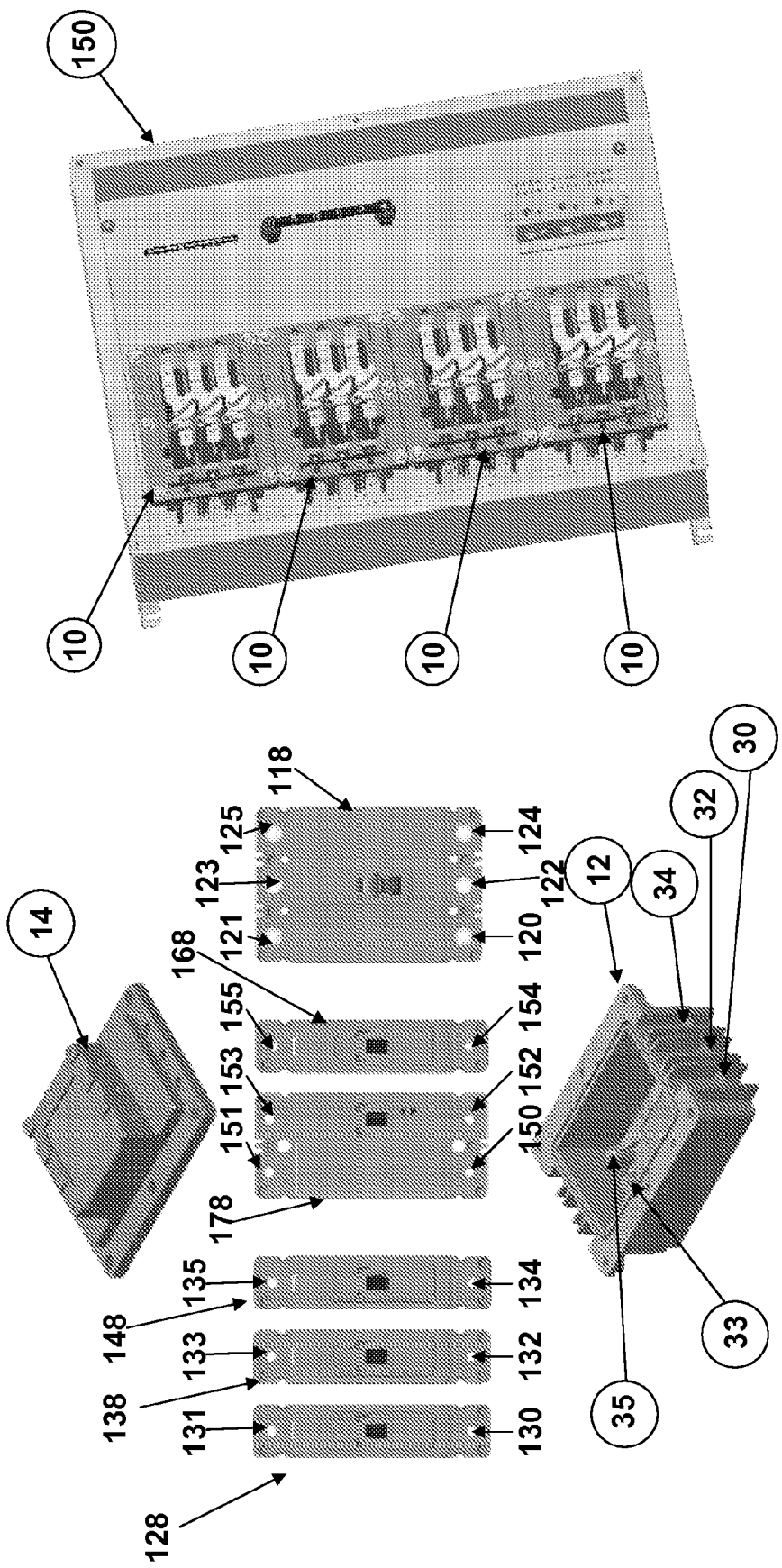
FIG. 16 is a perspective view of various types of circuit breakers that may be positioned within the sealed electrical enclosure of FIG. 1.
FIG. 17 is a perspective view of four sealed electrical enclosures positioned on an electrical panel.

FIG. 16 discloses bottom housing 12 along with various circuit breakers 118, 128, 138, 148, 168, and 178 that may be positioned within bottom housing 12. For example, circuit breaker 118 is of a 3 pole variety having a single switch. When circuit breaker 118 is properly positioned within bottom housing 12, electrical terminal 124 of the circuit breaker 118 contacts bus 34 within the bottom housing 12, electrical terminal 122 contacts bus 32 within the bottom housing 12, and electrical terminal 120 contacts bus 30 within the bottom housing 12. Similarly, electrical terminal 125 of circuit breaker 118 contacts bus 35 within the bottom housing 12, electrical terminal 123 contacts bus 33 within the bottom housing 12, and electrical terminal 121 contacts bus 31 (not shown) within the bottom housing 12. In this manner, the enclosure 10 may accommodate a 3 pole circuit breaker having a single switch.

FIG. 16 also discloses that more than one circuit breaker may be accommodated. For example, circuit breakers 128, 138, and 148, all of a 1 pole one switch variety may all be positioned within the bottom housing 12. Circuit breaker 148 may be properly positioned within bottom housing 12 so that electrical terminal 134 of the circuit breaker 148 contacts bus 34 within the bottom housing 12 and electrical terminal 135 contacts bus 35 within the bottom housing 12. Similarly, circuit breaker 138 may be properly positioned within bottom housing 12 next to circuit breaker 148 so that electrical terminal 132 of the circuit breaker 138 contacts bus 32 within the bottom housing 12 and electrical terminal 133 contacts bus 33 within the bottom housing 12. Additionally, circuit breaker 128 may be properly positioned within bottom housing 12 next to circuit breaker 138 so that electrical terminal 130 of the circuit breaker 128 contacts bus 30 within the bottom housing 12 and electrical terminal 131 contacts bus 31 (not shown) within the bottom housing 12. In this manner, the enclosure may accommodate three separate circuit breakers, in this case each being of the one pole, one switch variety.

FIG. 16 further discloses that the sealed enclosure may accommodate circuit breakers of varying types and dimensions. For example, circuit breaker 168, a single pole single switch type, may be positioned within the bottom housing 12 so that electrical terminal 154 of the circuit breaker 168 contacts bus 34 within the bottom housing 12 and electrical terminal 155 contacts bus 35 within the bottom housing 12. Additionally, circuit breaker 178, a 2 pole, single switch type, may be properly positioned within bottom housing 12 next to circuit breaker 168 so that electrical terminal 152 of the circuit breaker 178 contacts bus 32 within the bottom housing 12 and electrical terminal 153 contacts bus 33 within the bottom housing 12, while electrical terminal 150 contacts bus 30 within the bottom housing 12 and electrical terminal 151 contacts bus 31 (not shown) within the bottom housing 12. In this manner, the enclosure may accommodate two different circuit breakers of different geometries and design.

It will be appreciated that the enclosure could be enlarged to house additional circuit breakers and its geometry could be modified to accommodate circuit breakers of varying size.

The sealed enclosure described herein may be used in hazardous (classified) locations including Class I, Division 2 and Class I, Zone 1 environments, and it is believed that it is arc flash proof as well.

FIG. 17 discloses four sealed electrical enclosures 10 mounted on an electrical panel 150. It is contemplated that enclosures 10 may be mounted in suitable electrical panels boxes, including stainless steel, plastic, and thin-wall cast panel boxes.

While certain features and embodiments of the present application have been described in detail herein, it is to be understood that the application encompasses all modifications and enhancements within the scope and spirit of the following claims.

We claim:

1. A sealed electrical enclosure for use in hazardous locations for enclosing circuit breakers or other electrical components comprising:
    a bottom housing having a first end wall and a second end wall opposite the first end wall;
    a top housing positioned above the bottom housing;
    a labyrinth seal or joint being formed between the bottom housing and the top housing;
    the bottom housing adapted to receive one or more circuit breakers or other electrical components;
    a first metal bus extending from a point internal to the bottom housing through the first end wall to a point external to the bottom housing;
    a second metal bus extending from a point internal to the bottom housing through the second end wall to a point external to the bottom housing;
    where the first metal bus and the second metal bus are adapted to contact first and second electrical terminals of a first circuit breaker when placed within the bottom housing;
    a first actuating mechanism positioned on the top housing adapted for manipulating one or more switches of circuit breakers or electrical components positioned within the bottom housing;
    a first vent positioned on the top housing for dissipating pressure buildup within the housing;
    and wherein the top housing is removably secured to the bottom housing to allow for removal and replacement of circuit breakers or other electrical components within the housing.

2. The sealed electrical enclosure of claim 1, wherein the first vent is comprised of sintered bronze.

3. The sealed electrical enclosure of claim 1, further including a third metal bus extending from a point internal to the bottom housing through the first end wall to a point external to the bottom housing;
    a fourth metal bus extending from a point internal to the bottom housing through the second end wall to a point external to the bottom housing;
    where the third metal bus and the fourth metal bus are adapted to contact the first and second electrical terminals of a second circuit breaker when placed within the bottom housing.

4. The sealed electrical enclosure of claim 1, further including a second vent positioned on the bottom housing for dissipating heat and pressure buildup within the housing.

5. The sealed electrical enclosure of claim 1, wherein the bottom housing and top housing may be bolted together to secure the top housing to the bottom housing.

6. The sealed electrical enclosure of claim 1, wherein the bottom housing and top housing are comprised of non-conductive plastic.

7. The sealed electrical enclosure of claim 3, further including a fifth metal bus extending from a point internal to the bottom housing through the first end wall to a point external to the bottom housing;
  a sixth metal bus extending from a point internal to the bottom housing through the second end wall to a point external to the bottom housing;
  where the fifth metal bus and the sixth metal bus are adapted to contact the first and second electrical terminals of a third circuit breaker when placed within the bottom housing.

8. The sealed electrical enclosure of claim 1, wherein the bottom housing is adapted to receive F-frame circuit breakers.

9. The sealed electrical enclosure of claim 1, wherein the bottom housing is adapted to receive QC-series circuit breakers.

10. The sealed electrical enclosure of claim 3, wherein the first, second, third, and fourth buses are adapted to electrically connect to electrical terminals within an electrical panel box.

11. The sealed electrical enclosure of claim 1, wherein the first actuating mechanism includes a rigid rod that slidably moves within an interior of the top housing.

12. The sealed electrical enclosure of claim 11, wherein a switch manipulator is attached to the rigid rod.

13. The sealed electrical enclosure of claim 1, wherein the labyrinth seal or joint comprises a serrated joint.

14. The sealed electrical enclosure of claim 1, wherein the top housing may be removed from the bottom housing to allow for removal and replacement of circuit breakers or other electrical components positioned therein.

15. The sealed electrical enclosure of claim 1, wherein a second actuating mechanism is positioned on the top housing for manipulating the switch of a second circuit breaker positioned within the housing, such that the first actuating mechanism and the second actuating operate independently to manipulate the switches of different circuit breakers positioned within the bottom housing.

16. The sealed electrical enclosure of claim 1, wherein the first actuating mechanism includes a knob or extension such that the first actuating mechanism may be operated when the sealed electrical housing is positioned within an electrical panel box.

17. The sealed electrical enclosure of claim 1, wherein circuit breakers positioned within the bottom housing may be electrically connected to electrical terminals positioned within an electrical panel box after the top housing is secured to the bottom housing.

18. The sealed electrical enclosure of claim 1, wherein the enclosure is arc-flash proof.

19. The sealed electrical enclosure of claim 3, wherein the first, second third, and fourth buses are set in the first and second sidewalls of the bottom housing during a molding process.

20. The sealed electrical enclosure of claim 1, wherein the sealed enclosure is adapted for installment within an electrical panel box.

21. The sealed electrical enclosure of claim 20, wherein a plurality of the sealed enclosures are positioned within an electrical panel box.

22. The sealed electrical enclosure of claim 5, wherein six bolts are used to secure the top housing to the bottom housing.

23. A sealed electrical enclosure for use in hazardous locations for enclosing circuit breakers or other electrical components comprising:
  a bottom housing having a first end wall and a second end wall opposite the first end wall;
  a top housing positioned above the bottom housing;
  a labyrinth seal or joint being formed between the bottom housing and the top housing;
  the bottom housing adapted to receive a plurality of circuit breakers or other electrical components;
  a first metal bus extending from a point internal to the bottom housing through the first end wall to a point external to the bottom housing;
  a second metal bus extending from a point internal to the bottom housing through the second end wall to a point external to the bottom housing;
  where the first metal bus and the second metal bus are adapted to contact first and second electrical terminals of a first circuit breaker when placed within the bottom housing;
  a third metal bus extending from a point internal to the bottom housing through the first end wall to a point external to the bottom housing;
  a fourth metal bus extending from a point internal to the bottom housing through the second end wall to a point external to the bottom housing;
  where the third metal bus and the fourth metal bus are adapted to contact first and second electrical terminals of a second circuit breaker when placed within the bottom housing;
  a first actuating mechanism positioned on the top housing adapted for manipulating one or more switches of circuit breakers or electrical components positioned within the bottom housing;
  a first vent positioned on the top housing for dissipating pressure buildup within the housing;
  a second vent positioned on the bottom housing for dissipating heat and pressure buildup within the housing,
  and wherein the top housing is removably secured to the bottom housing to allow for removal and replacement of circuit breakers or other electrical components within the housing.

* * * * *